Patented Oct. 7, 1924.

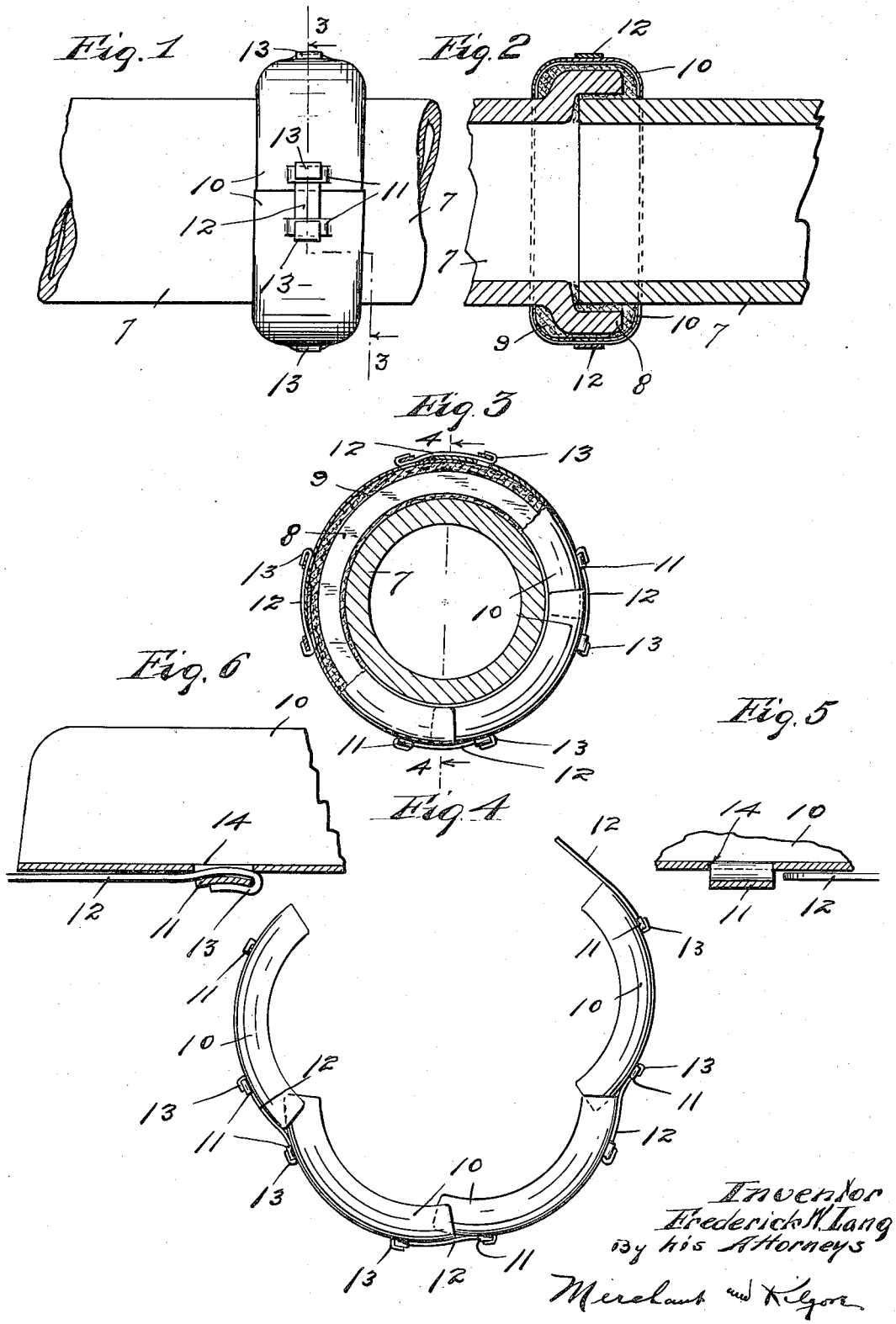

1,510,483

UNITED STATES PATENT OFFICE.

FREDERICK W. LANG, OF MINNEAPOLIS, MINNESOTA.

JOINT PROTECTOR FOR SEWER PIPES.

Application filed April 17, 1922. Serial No. 554,141.

*To all whom it may concern:*

Be it known that I, FREDERICK W. LANG, a citizen of the United States, residing at Minneapolis, in the county of Hennepin and State of Minnesota, have invented certain new and useful Improvements in Joint Protectors for Sewer Pipes; and I do hereby declare the following to be a full, clear, and exact description of the invention, such as will enable others skilled in the art to which it appertains to make and use the same.

My present invention relates to improvements in joint protectors for sewer pipes of the type disclosed and broadly claimed in my U. S. Letters Patent 1,255,023, issued January 29, 1918, and has for its primary object to simplify the construction thereof and reduce the cost of production.

To the above end, the invention consists of the novel devices and combinations of devices hereinafter described and defined in the claims.

To lay sewer pipes, as stated in my above identified patent, it is customary to dig holes in the ground, various distances apart, and then connect the same by digging small tunnels therebetween. On the bottoms of these holes and in the tunnels, the sewer pipe sections are laid. In laying the sewer pipe sections in the tunnel, it is necessary to first shove one of the pipe sections into the tunnel. A second pipe section is then telescopically connected to the first laid pipe section to form the joint therebetween. These two connected pipe sections are then shoved endwise farther into the tunnel. This operation is repeated until a sufficient number of pipe sections have been laid.

Cement is placed around the joints between the several pipe sections in an attempt to make the same waterproof. To get the cement around the joints of the pipe sections coming in the tunnels, it is necessary to place the same around the joints as the pipe sections are connected and shoved endwise into the tunnel. This cement very often drops off or is dislodged before the pipe sections reach their final resting place. The settling of the ground also very often cracks and dislodges cement around the joints, thereby rendering the same faulty. These faulty joints not only leak water but permit the roots of trees, in their search for moisture, to grow and work their way between the joints of the pipe sections, so that finally the sewer pipe becomes clogged with roots and materials collected thereby.

By the use of my invention, which is an extremely simple device and of small cost to manufacture, joints in sewer pipes and similar conduits may be made tight, thereby preventing roots from growing into or through the joints in the pipe section.

In the accompanying drawings, which illustrate the invention, like characters indicate like parts throughout the several views.

Referring to the drawings:

Fig. 1 is an elevation of the improved joint-protector applied around the joint of two sewer pipe sections;

Fig. 2 is a longitudinal central section taken on the line 2—2 of Fig. 3;

Fig. 3 is a view partly in elevation and partly in transverse section taken on the line 3—3 of Fig. 1;

Fig. 4 is a view of the improved joint-protector opened up ready for application the joint between the sewer pipe sections;

Fig. 5 is a fragmentary detail view, principally in section, of one of the hinge-acting strap sections before the strap is inserted through the loop; and Fig. 6 is a view corresponding to Fig. 5 with the exception that the strap has been secured to the loop.

The numeral 7 indicates sewer pipe sections, each having at one end a hub 8 into which the small end of an adjacent pipe section is telescoped to afford a loose joint therebetween. Cement 9 is placed around the joint between the pipe sections 7.

The improved joint-protector is of annular form, segmental in cross section, and preferably constructed of sheet metal. This annular joint-protector is made up of connected quarter sections adapted to be opened up in the plane of the protector and applied around the cement 9 before the same has set.

The sections 10 are identical, the one with the other, and, as shown, they are all pressed from sheet metal by the same die. Cut and pressed from each section 10, near each end thereof, is a transverse outstanding loop 11. Hinge-acting metal straps 12 are inserted under the loops 11 and their end portions bent upon the loops 11 to afford hooks 13 which interlock with said loops. These hinge-acting straps 12 are all alike and are cut from sheet metal. To prevent the hooks 13 from being disconnected from the loops 11 by endwise movement of the straps 12, said hooks are struck by a hammer to bend or depress the loops 11 and underlying portions of the straps 12 to force said strap portions into slots 14 produced by forming the loops 11 (see Fig. 6).

In assembling the sections 10, to form one of the improved joint-protectors, all of the straps 12 with the exception of one end of one of said straps, are inserted under the loops 11 and then bent upon themselves to form the hooks 13. These hooks 13 connect adjacent sections 10 and hold the same in overlapping arrangement with freedom for hinge-like movement so that they may be opened up, as shown in Fig. 4. After the joint-protector is applied around the cement joint 9, the remaining free end of the respective strap 12 is inserted through the loop 11 of the adjacent section 10 and then bent to form one of the hooks 13, after the sections 10 have been tightly drawn around said joint.

From the above description, it is evident that the duplicate sections may be very quickly assembled and connected by the duplicate end straps 12.

In applying the improved joint protector around a pipe joint, the cement 9 may be placed, either directly on the pipe joint or in the sections 10, or some of the cement may be placed directly around the pipe joint and the rest of it in the sections 10.

The fastening of the last strap 12 permits circumferential adjustment of the joint-protector for pipe sections which vary in diameter before the hook 13 is formed thereon, to secure said protector in position.

What I claim is:

1. A protector of the kind described comprising duplicate segmental sections that have overlapping engagement that permit circumferential sliding movement of one of said sections upon the other, and loose duplicate hinge straps connected to said sections.

2. The structure defined in claim 1 in which transverse loops are cut and pressed from the sections and under which loops said straps extend and are bent at different longitudinally spaced points to form hooks that adjustably connect said sections.

In testimony whereof I affix my signature.

FREDERICK W. LANG.